UNITED STATES PATENT OFFICE.

JOHN LASKEY DOBELL, OF HARLESDEN, ENGLAND.

DIAPHRAGM FOR ELECTRIC BATTERIES.

SPECIFICATION forming part of Letters Patent No. 681,532, dated August 27, 1901.

Application filed December 6, 1897. Serial No. 660,890. (Specimens.)

*To all whom it may concern:*

Be it known that I, JOHN LASKEY DOBELL, electrician, a subject of the Queen of Great Britain, residing at No. 46 Connaught road, Harlesden, in the county of Middlesex, England, have invented certain new and useful Improvements in or Connected with Electric Batteries, of which the following is a specification.

This invention relates to that class of battery in which litharge or like oxid and limited quantities of caustic soda and caustic potash are maintained in a state of fusion within a porous pot and act in conjunction with another medium, such as fused lead and carbonaceous material in which the porous pot is immersed, to generate electricity.

In practice it is found that a porous pot of the ordinary kind is incapable of resisting the action of the fused oxids, but speedily becomes disintegrated or decomposed, and consequently destroys the efficiency of the battery.

Now the object of the present invention is to obtain a porous pot which will effectually resist the action of the mixture of fused oxids and a small amount of caustic soda and caustic potash.

In carrying the invention into effect a quantity of magnesite which has been previously calcined and ground to a finely-divided state is moistened with a saturated solution of boracic acid in water or in spirit and water, and the mass is then kneaded or mixed into a stiff paste or dough, after which it is shaped to the required form of the porous pot, which is then dried by any suitable means and is fired or baked in a muffle or furnace and caused or allowed gradually to cool, after which it is ready for use. As water dissolves a comparatively small quantity of boracic acid, the quantity of the latter incorporated with the calcined magnesite may, if desired, be increased by the addition of a suitable quantity of a saturated solution of boracic acid in spirit, or a solution of boracic acid in spirit may be alone employed. The calcined magnesite may be slaked and dried after having been ground. In cases where it is desired to increase the porosity of the magnesite pot a quantity of sawdust, bran, flour, or other similar material is mixed with the magnesite, and in this case the article must be fired or baked to carbonize or destroy the bran, sawdust, or other material.

Although the invention is described in connection with porous pots or vessels, it will be understood that it is equally applicable to porous plates or slabs or other articles employed for like purposes.

By the means hereinbefore described and at little or no additional expense a porous pot or other article is obtained which will effectually resist the action of the fused mixture, and thus obviate the difficulty above pointed out.

I claim as my invention—

1. As a new article of manufacture, a shaped pot to be baked or fired, and consisting of calcined magnesite, mixed with boracic acid and also with finely-divided carbonizable material, as and for the purpose described.

2. The process herein described of making a porous pot, consisting in reducing calcined magnesite to a fine state of division moistening it with an alcoholic solution of boracic acid, then making into a stiff paste or dough and shaping this to the required form, and drying and baking it, all substantially as described.

3. The process herein described of making a porous pot, consisting in reducing calcined magnesite to a fine state of division, combining finely-divided carbonizable material with it, moistening it with a solution of boracic acid, then making it into a stiff paste or dough, shaping this into the required form and drying and baking it, all substantially as described.

JOHN LASKEY DOBELL.

Witnesses:
GEO. S. VAUGHAN,
A. G. FOOKS.